US012153403B2

(12) United States Patent
Ottnad et al.

(10) Patent No.: US 12,153,403 B2
(45) Date of Patent: Nov. 26, 2024

(54) METHOD FOR LINKING INFORMATION WITH A WORKPIECE DATA RECORD, AND FLATBED MACHINE TOOL

(71) Applicant: TRUMPF Werkzeugmaschinen SE + Co. KG, Ditzingen (DE)

(72) Inventors: Jens Ottnad, Karlsruhe (DE); Manuel Kiefer, Sinsheim (DE); Korbinian Weiss, Korntal (DE); Willi Poenitz, Leonberg (DE); Marc Teschner, Stuttgart (DE); Daniel Gebhard, Eppingen (DE)

(73) Assignee: TRUMPF WERKZEUGMASCHINEN SE + CO. KG, Ditzingen (DE)

( * ) Notice: Subject to any disclaimer, the term of this patent is extended or adjusted under 35 U.S.C. 154(b) by 345 days.

(21) Appl. No.: 17/747,046

(22) Filed: May 18, 2022

(65) Prior Publication Data

US 2022/0276637 A1    Sep. 1, 2022

Related U.S. Application Data

(63) Continuation of application No. PCT/EP2020/081149, filed on Nov. 5, 2020.

(30) Foreign Application Priority Data

Nov. 19, 2019 (DE) ...................... 10 2019 131 235.3

(51) Int. Cl.
G05B 19/4155 (2006.01)
(52) U.S. Cl.
CPC .................. *G05B 19/4155* (2013.01); *G05B 2219/49355* (2013.01)

(58) Field of Classification Search
None
See application file for complete search history.

(56) References Cited

U.S. PATENT DOCUMENTS

| | | | |
|---|---|---|---|
| 2015/0146008 A1 | 5/2015 | Conner et al. | |
| 2016/0161301 A1 | 6/2016 | Guenther et al. | |
| (Continued) | | | |

FOREIGN PATENT DOCUMENTS

| | | | |
|---|---|---|---|
| AT | 513130 A4 | 2/2014 | |
| DE | 10054095 A1 | 5/2002 | |
| (Continued) | | | |

OTHER PUBLICATIONS

Translation of DE102017107357A1 (Year: 2017).*

*Primary Examiner* — Ryan A Jarrett
(74) *Attorney, Agent, or Firm* — LEYDIG VOIT & MAYER LTD.

(57) ABSTRACT

A method for linking information with a workpiece data record of a workpiece includes registering a selection time relating to a first action of a user that has a spatial relationship with a workpiece, determining a position of a hand of the user in a space at the selection time using a locating system, deriving a selection position in a support plane from the determined position of the hand, selecting a workpiece data record from the workpiece data records by comparing the selection position with relative positions and contours of the workpieces, registering a second action in which the user carries out a gesture movement, wherein an information item to be logged in a database is assigned to the gesture movement, reading the information item from the database, and linking the information item with the selected workpiece data record.

20 Claims, 4 Drawing Sheets

(56) References Cited

U.S. PATENT DOCUMENTS

2017/0344250 A1 11/2017 Iwamura
2018/0219024 A1 8/2018 Liu et al.
2018/0349373 A1 12/2018 Sauerwein, Jr.
2019/0240703 A1 8/2019 Kiefer et al.

FOREIGN PATENT DOCUMENTS

| DE | 10215885 A1 | 10/2003 |
| DE | 102011002952 A1 | 7/2012 |
| DE | 102012200404 A1 | 7/2013 |
| DE | 102015111506 A1 | 4/2016 |
| DE | 102017004926 A1 | 12/2017 |
| DE | 102016220352 A1 | 4/2018 |
| DE | 102017107357 A1 | 4/2018 |
| DE | 102017219288 A1 | 5/2019 |
| DE | 102018000733 A1 | 8/2019 |
| WO | WO 2018073420 A1 | 4/2018 |

* cited by examiner

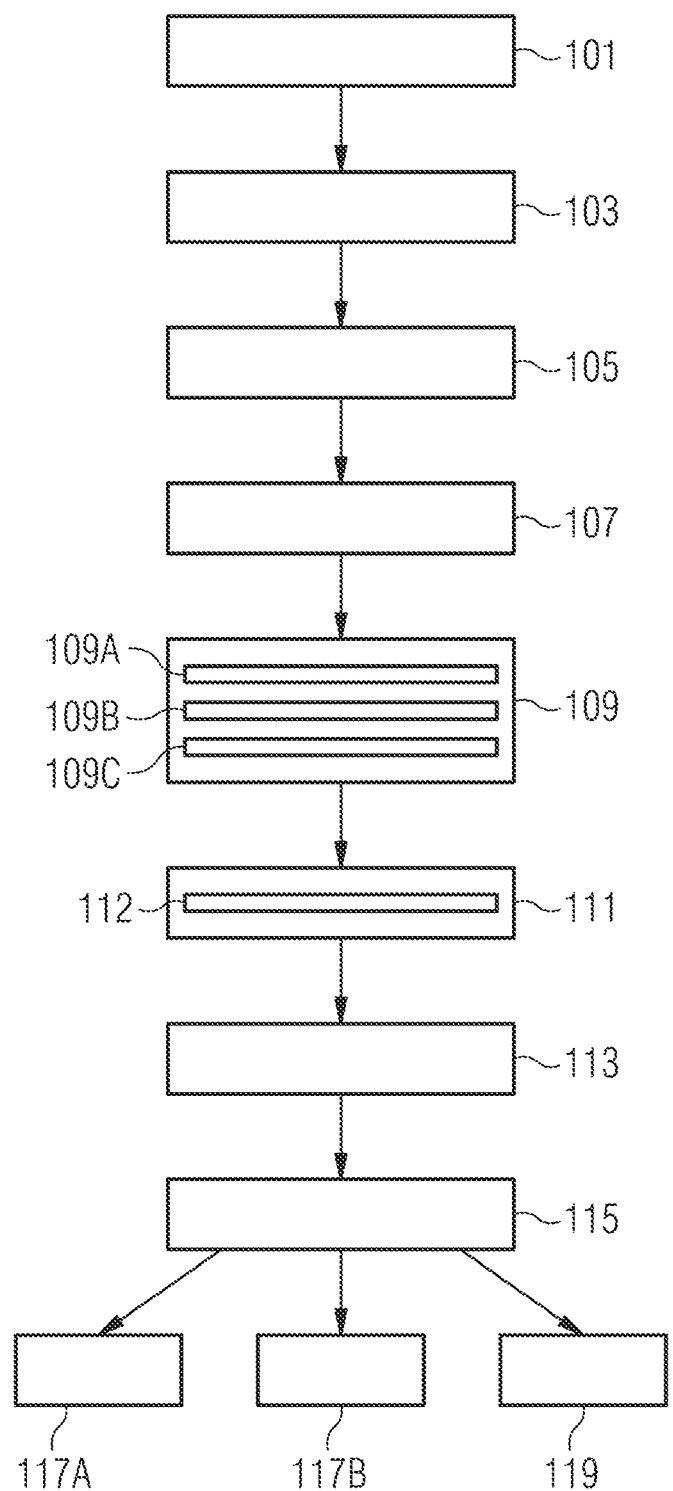

METHOD FOR LINKING INFORMATION WITH A WORKPIECE DATA RECORD, AND FLATBED MACHINE TOOL

CROSS REFERENCE TO RELATED APPLICATIONS

This application is a continuation of International Application No. PCT/EP2020/081149 (WO 2021/099138 A1), filed on Nov. 5, 2020, and claims benefit to German Patent Application No. DE 10 2019 131 235.3, filed on Nov. 19, 2019. The aforementioned applications are hereby incorporated by reference herein.

FIELD

Embodiments of the present invention relate to methods for linking information with a workpiece data record of a workpiece in an arrangement of workpieces located in a support plane of the sorting table, in particular for integrating a manual sorting-out procedure into the operation of flatbed machine tools. Further, embodiments of the present invention relate to correspondingly designed flatbed machine tools.

BACKGROUND

Within the scope of sorting out parts on machine tools, in particular laser-cut goods or punched workpieces such as sheet parts, a user usually visually compares each individually cut part with an order drawn for the respective part. Sheet parts that were cut or punched incorrectly are labeled as rejects and removed. By way of example, when a user identifies a reject on the sorting table, they can implement appropriate logging on a user terminal. However, they must move to the location of the user terminal in this case. Alternatively, the user could perform several/all correction logs collectively. However, multiple logging is susceptible to errors.

A method for assisting a user with a sorting-out procedure for workpieces arranged on a sorting table, which is also referred to as part singulation, is described in WO 2018/073420 A1 by the applicant, with locating systems in particular being used to locate the hand of the user.

A method for automated process control is known from DE 102 15 885 A1. Further, intelligent gloves for industrial use, in particular for the assistance of workflows in industrial manufacturing, are known, for example from DE 10 2015 111 506 A1 and DE 10 2011 002 952 A1.

SUMMARY

Embodiments of the present invention provide a method for linking information with a workpiece data record of a workpiece in an arrangement of workpieces located in a support plane of a sorting table is provided. The workpieces have been produced from a planar material by a flatbed machine tool in accordance with a processing plan stored in a control unit of the flatbed machine tool. The processing plan includes workpiece data records, in which relative positions and contours of the workpieces in the arrangement of workpieces are stored. The method includes registering a selection time relating to a first action of a user that has a spatial relationship with a workpiece to be selected, determining a position of a hand of the user in a space above the arrangement of workpieces at the selection time using a locating system, deriving a selection position in the support plane from the determined position of the hand, selecting a workpiece data record from the workpiece data records by comparing the selection position with the relative positions and the contours of the workpieces, registering a second action, in which the user carries out a gesture movement, wherein an information item to be logged in a database is assigned to the gesture movement, reading the information item from the database, and linking the information item with the selected workpiece data record.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 5 shows a flowchart for elucidating an exemplary method procedure for linking information with a workpiece data record.

DETAILED DESCRIPTION

Figure 1:
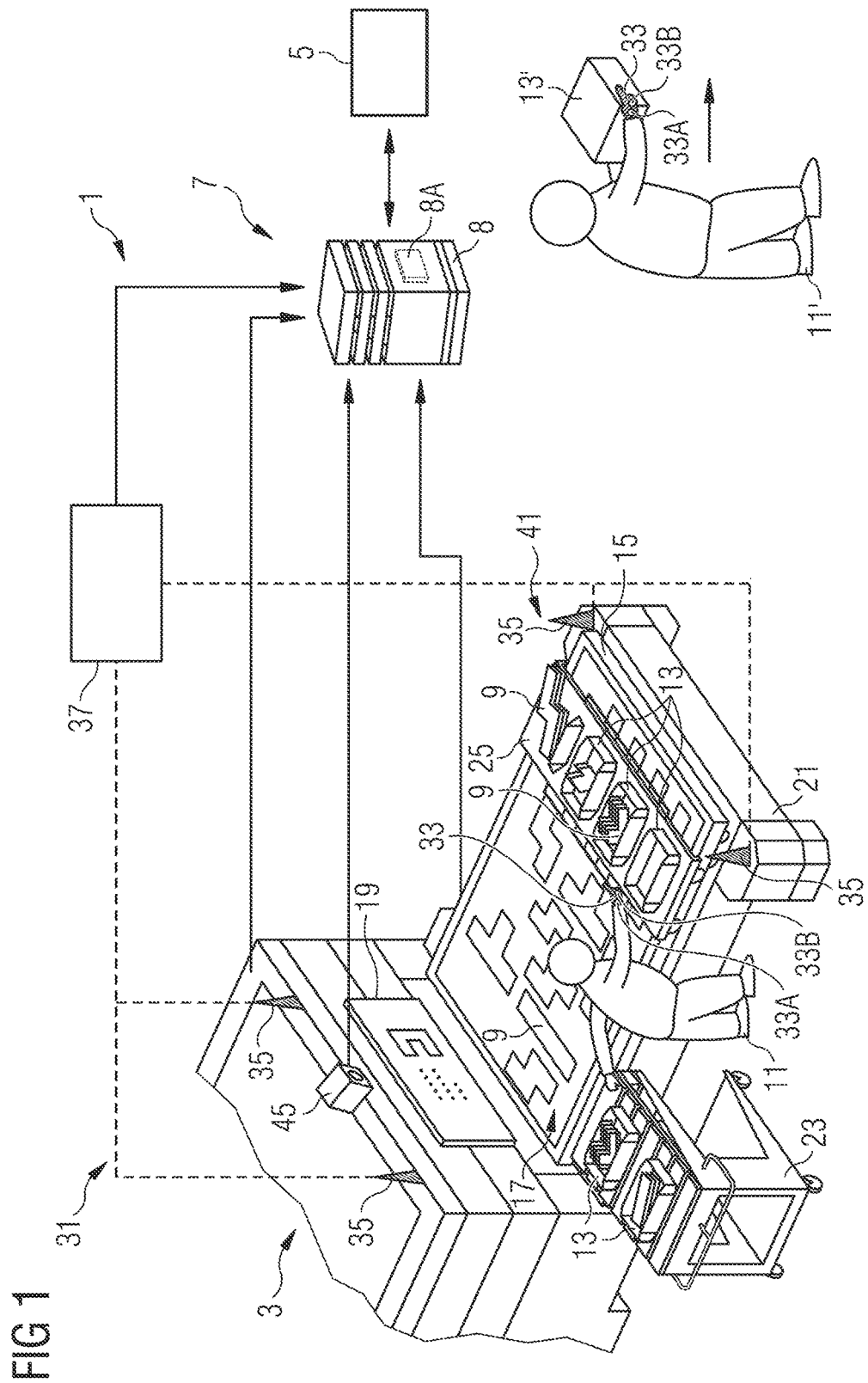
FIG. 1 shows a schematic spatial representation of a portion of a smart factory with a laser cutting or punching flatbed machine tool.

One aspect of this disclosure is based on the object of reducing travel between sorting table and user terminal, in particular when logging rejects, and of avoiding errors. A further object lies in simplifying the assignment of information to data records of produced workpieces and/or reducing errors within the scope of the assignment of information.

At least one of these objects is achieved by method for linking information with a workpiece data record of a workpiece in an arrangement of workpieces located in a support plane of a sorting table as claimed in claim 1 and by a flatbed machine tool as claimed in claim 13. Developments are specified in the dependent claims.

One aspect of this invention relates to a method for gesture-based logging of a workpiece-specific sorting out procedure of workpieces arranged on a sorting table, said workpieces having been produced by a flatbed machine tool, in particular a laser cutting or punching flatbed machine tool, in accordance with a processing plan. The method comprises the steps of:

registering a selection gesture of a user for identifying one of the arranged workpieces, the selection gesture being spatially related to the workpiece to be identified, and registering a logging gesture for the identified workpiece.

A further aspect has disclosed a method for linking information with a workpiece data record of a workpiece in an arrangement of workpieces located in a support plane of a sorting table. The workpieces were produced from a planar material by a flatbed machine tool, in particular a laser cutting or punching flatbed machine tool, in accordance with a processing plan stored in a control unit of the flatbed machine tool. The processing plan comprises workpiece data records, in which relative positions and contours of the workpieces in the arrangement of workpieces are stored. The method includes the following steps:

registering a selection time by way of a first action of a user that has a spatial relationship with a workpiece to be selected, determining a position of a hand of the user in space above the arrangement of workpieces at the selection time using a locating system, deriving a selection position in the support plane from the determined position of the hand, selecting a workpiece data record from the workpiece data records by comparing the selection position with the relative positions and contours of the workpieces, as a workpiece data record selected by the first action, registering a second action, within the scope of which the user carries out a gesture movement, an information item to be logged being assigned to the gesture movement in a database, reading the information item to be logged from the database, and linking the information item to be logged with the selected workpiece data record.

In a further aspect, a flatbed machine tool, in particular a laser cutting or punching flatbed machine tool, comprises a processing unit, in particular a laser cutting or punching processing unit, and a control unit in which a processing plan is stored, for driving the processing unit to produce workpieces arranged in space next to one another. Further, the flatbed machine tool comprises a sorting table for providing the produced workpieces which are arranged next to one another in a support plane, for sorting out by a user, and a locating system for determining a position of a hand of the user in space. The control unit is designed to carry out the methods disclosed herein.

In some embodiments, the first action can be a selection gesture movement, which is carried out by the user above the arrangement of workpieces using their hand and which is registered by an acceleration sensor worn on the hand or by the locating system. By way of example, the selection gesture movement can a tapping movement toward the workpiece to be selected. The tapping movement can be optionally registered by the locating system and can be output as position data of strung-together positions of the hand. In this case, a position in the support plane, which is located in the continuation of the strung-together positions, can be derived as the selection position.

In some embodiments, the user can wear/carry a selection assistance unit, more particularly a glove, an armband or a stylus, close to the hand for the purposes of determining the position of the hand of the user. The selection assistance unit can optionally have an acceleration sensor and/or an active transmitter of a locating system and/or a passive transmitter of a locating system and/or be formed as part of the locating system.

In some embodiments, the locating system for determining the position of the hand of the user can register a position of a stylus held in the hand. The first action may comprise the stylus being tapped on the workpiece to be selected, and position data of a tip of the stylus in or near the support plane can be derived as selection position. The stylus may comprise a pressure-sensitive pressure sensor, in particular in a tip of the stylus, and may further be designed to output a trigger signal when the pressure sensor is activated. The first action may comprise pressing the stylus on the workpiece to be selected for the purposes of activating the pressure sensor and outputting a trigger signal by the stylus. The method may then further comprise the following steps: registering the trigger signal and determining the selection time as the time when said trigger signal is registered; and restricting the positions of the hand registered by the locating system to the selection time or to a time window around the selection time.

In some embodiments, the locating system can be designed to evaluate image data from one or more cameras for the image-assisted determination of the position of the hand of the user. Alternatively, the locating system can be based on ultra-wideband locating of a mobile unit worn near the hand and a position of a hand of the user, in particular a gesture movement, can be determined in space by evaluating the position data of the mobile unit obtained by the locating system (obtained using the locating system).

In some developments of the method, comparing the selection position with the relative positions and contours of the workpieces may comprise the following steps:

registering the relative position of the arrangement of workpieces in the support plane using a camera, generating transformed data of the relative positions and contours of the workpieces by transforming the relative positions and contours of the workpieces into the support plane on the basis of the registered relative position of the arrangement of workpieces, and comparing the selection position with the transformed data of the relative position and contours of the workpieces.

In some embodiments, a plurality of selection positions can be derived for a plurality of successively registered first actions, a plurality of selected workpiece data records being selected for said selection positions. The plurality of selected workpiece data records can be linked uniformly to the information item to be logged by registering the second action.

In some embodiments, the information to be logged can comprise a classification as a reject and the method may further comprise the step of including the selected workpiece data record in a reject list.

In some developments, the method may further comprise as method step displaying on a display unit workpiece-specific information in relation to the workpiece data record selected by the first action. The workpiece-specific information may optionally comprise customer information, information in relation to the subsequent process step, a number of further parts that are the same, an assigned workpiece collection location or an order number for the workpiece belonging to the selected workpiece data record. Further, the method may optionally comprise supplementing the displayed workpiece-specific information with the information to be logged that is linked to the selected workpiece data record.

In some developments, the method may further comprise as a method step outputting feedback to the user after linking. The feedback can optionally be implemented by vibration feedback, visual feedback or acoustic feedback.

In some developments of the flatbed machine tool, the latter further comprises an acceleration sensor worn on the hand and/or a stylus for simplifying the locating process. The stylus can optionally be designed as a pressure-sensitive stylus with a pressure sensor which causes a trigger signal for restricting the positions of the hand for registering a gesture movement, registered by the locating system, to a time window around the registration of the trigger signal when the stylus is pressed on the workpiece. Alternatively or in addition, the stylus may optionally have an active transmitter and/or passive transmitter, the position of which is able to be registered by the locating system as position of the hand of the user.

In general, the locating system may comprise at least one antenna for receiving signals of a selection assistance unit worn/carried near the hand. Alternatively or in addition, the locating system may comprise one or more cameras for capturing the image of the position of the hand of the user and/or of a selection assistance unit.

In general, the concepts disclosed herein may facilitate an increase in the process reliability, an optimization of run times and, correspondingly, a cost optimization of the production. Specifically, the concepts disclosed herein may bring about partly significant savings in terms of time when assigning rejects.

Concepts which allow aspects from the prior art to be improved at least in part are disclosed herein. In particular, further features and the usefulness thereof emerge from the following description of embodiments on the basis of the drawings.

Aspects described herein are partly based on the discovery that specific actions such as a gesture control can simplify the sorting procedure within the scope of a sorting out procedure for cut goods, which were produced by means of laser cutting (or punching) flatbed machine tools according to a processing plan. What is proposed here in particular is the use of a first action of the user to evaluate a continuously implemented locating process in relation to the hand of the user for a selection of a workpiece. The selection is required to allow a specific information item to be digitally linked with one or more selected workpieces, for example by virtue of the information being stored with a corresponding workpiece data record. By way of example, a workpiece can be linked with workpiece-specific process information, such as erroneous cuts or rejects. Further, a workpiece can be linked with information created by a user, for example with information regarding the quality, which is obtained by manual measurement or visual inspection of the workpieces. The input of this manually registered information can be implemented by way of a gesture-controlled input.

To locate the hand of the user, which is required to this end, it is proposed to equip a flatbed machine tool, in particular a sorting table, with a locating system. By way of example, the locating system can be an ultra-wideband (UWB) locating system or an image-based locating system. Further, it is also possible to use acceleration sensors, for example in an armband or smartwatch, to register movements and actions of the user.

A UWB locating system comprises, e.g., a plurality of stationary units ("anchors") and at least one mobile unit on the hand of the user (e.g., a "tag" or position sensor), and obtains position data from the mobile unit by interchanging UWB signals. By way of example, a tag can be worn close to the hand with a data glove or any other medium situated on the user, for instance a ring, an armband, a watch (smartwatch) or a thimble (generally also referred to as wearables). Acceleration sensors can be integrated in the process, said acceleration sensors, e.g., being provided in the tags and being suitable for interaction by way of a registration of movements. An exemplary UWB locating system is described in the PCT application PCT/FR2019/000057 by BeSpoon SAS, entitled "ULTRA-WIDEBAND LOCATION SYSTEMS AND METHODS", filed on Apr. 19, 2019.

An image-based locating system may comprise one or more fixedly installed cameras for obtaining image data of the sorting table with the workpieces located thereon. Image recognition/image processing can also be improved by an optically conspicuous wearable or by a hand-held element such as a stylus (referred to herein as a selection assistance unit). Additionally or as an alternative, image data can be captured by smartglasses worn by the user. Thus, by means of cameras contained therein, smartglasses may in principle facilitate tracking of the hand in space by way of image processing. In addition to the image of the surroundings actually captured, information in respect of, e.g., a selected workpiece can be overlaid into the field of view of the smartglasses.

Consequently, the position and in particular also the movement of the hand of the user can be registered by evaluating camera images and/or position data from the mobile unit.

The right selection of the workpiece is decisive for the correct assignment of information to a workpiece data record. According to an embodiment of the invention, this is rendered possible by a specifically implemented action by the user.

Expressed differently, the concepts described herein allow an underlying manufacturing control system to be controlled by way of specific actions. By way of example, a gesture can be carried out as a "first action" by the user during the sorting out process. To this end, a procedure of grasping a workpiece to be selected can be accompanied by a specific gesture movement such as a repeated lowering of the hand (tapping) or pointing of the finger as a "first action". As an alternative or in addition to a gesture-based first action, the use of a foot switch or a switch sensor on the finger, on the hand or on the arm, and a voice control are possible.

If such a first action is registered, this determines the time (also referred to as selection time herein) for which the locating system should derive and output the position of the hand (also referred to selection position at the selection time herein). The workpiece to be selected is then determined on the basis of the selection position using knowledge of the relative positions of the workpieces; by way of example, the workpiece received by the gripping procedure is selected by the preceding tapping.

The concepts described herein further use an assignment of defined gestures to specific information items. Thus, if the user carries out one of the defined gestures in a second action, said gesture can be registered and the information assigned to the gesture can be linked to the workpiece data of the selected workpiece.

The procedure according to embodiments of the invention is explained in exemplary fashion below with reference to the drawings.

FIG. 1 shows an overview of a smart factory 1 which comprises production resources such as a laser cutting or punching flatbed machine tool 3 depicted in exemplary fashion, and a manufacturing execution system (MES) 5. In general, a flatbed machine tool can be a laser cutting or punching flatbed machine tool, which separates only by means of the laser or only by means of punching. Further, a flatbed machine tool can be a combination machine which implements both separation methods. Further processing steps, for example such as deburring, bending, seaming, welding, drilling, reaming, etc., may also be carried out on the flatbed machine tool. In the case of such laser cutting or punching machine tools, a processing plan (e.g., a cutting plan) is stored in the machine controller. The relative positions and contours of the workpieces to be generated can be retained in machine-readable fashion in the processing plan.

The virtual and physical production elements and production steps, in particular the information about workpieces 9 (required number, shape, material, type, . . . ), are merged in the MES 5 via a network 7. A control unit 8, for instance a PC, computing node or similar suitable hardware, serves to drive the flatbed machine tool 3, for example. The control unit can be formed as part of the MES 5 or locally as a separate unit on the flatbed machine tool 3. In particular, the control unit 8 is configured to assist the sorting out of the workpieces 9 and the removal of rejects by a user 11, for example to workpiece collection locations 13, during real-time operation of the smart factory 1. To this end, the underlying computing system comprises, for example, digital processing systems with microprocessor circuits comprising data inputs and control outputs, and databases 8A, which are operated in accordance with computer-readable instructions which are stored on a computer-readable medium. The control unit (the MES 5) provides significant computational power for real-time assistance. It further comprises a long-term (nonvolatile) memory for storing the program instructions and a very fast short-term (volatile) memory for storing captured data and the linking of the selected workpiece data record and the information generated in accordance with the method.

The workpieces 9 are output by the flatbed machine tool 3 as a plate 17 lying on a pallet 15. The pallet 15 forms a sorting table 21 for the part singulation. The user 11 takes the workpieces out of the residual grid and sorts them to the workpiece collection location units 13 for the respective further processing or classifies them as rejects. Using the method proposed herein, relevant information can be linked to a workpiece data record of a workpiece within the scope of the sorting out procedure.

Information stored during the sorting out process of the workpieces 9 and, in particular, also the newly linked information can be displayed in workpiece-specific fashion to the user on a display 19.

FIG. 1 further depicts a carriage 23 and a bridge 25 with a plurality of workpiece collection location units 13 that is displaceable over the sorting table 21. After depositing a required number of sorted out workpieces in a workpiece collection location unit 13', the latter is brought to a subsequent processing step, for example by a user 11' (or in automated fashion by a robotic system). Rejects can likewise be collected, or they remain in the residual grid. What is decisive for a digitized order accompaniment is that the MES 5 is informed accordingly. Expressed differently, it is desirable for appropriate information to be linked to the workpiece data records for the correctly and defectively produced workpieces, and for this information to be stored in the MES 5.

To be able to register the required position of the taking hand, a locating system 31 is provided in the region of the workspace and allows a hand of the user, and optionally also a selection assistance unit 33, to be located. The selection assistance unit 33 is situated in the vicinity of the hand/the aim of the user 11. In FIG. 1, it is worn by the user 11 in exemplary fashion as a glove. By way of example, the selection assistance unit 33 is a mobile unit 33B in the form of a radiofrequency identification (RFID) transmitter, the actual position of which can be identified in real time. Bearing transponder systems operate, for example, with a spatial resolution of a few centimeters around 2.45 GHz. In general, the selection assistance unit 33 can carry an active transmitter and/or passive transmitter of a locating system.

As shown in exemplary fashion in FIG. 1, the locating system 31 comprises four antennas 35 which are provided in the vicinity of the sorting table 21. Radio waves detected by way of the antennas 35 are transmitted as data to a position calculation portion 37 of the locating system 31, which for example determines the position of the selection assistance unit 33 from the different signal times of flight and which optionally derives a movement trajectory. The position can further be defined as a position of the hand for which a position in a support plane 41 of the pallet 15 can be derived (for example, by projecting the position of the hand into the support plane 41).

The relative position of the parts ready for removal can likewise be obtained in the coordinate system of the support plane 41 by means of the data regarding the workpiece production stored in the processing plan. As already mentioned, the workpiece 9 over which the hand is situated can be derived by way of the position of the selection assistance unit 33.

The selection assistance unit 33 may further comprise one or more sensors (e.g., an acceleration sensor 33A), which are designed for the detection of gestures. Further alternatively or additionally, the recognition of specific gestures can be assisted by a surround camera 45, which is attached above the sorting table 21, and/or the locating system 31. To transmit sensor data, the selection assistance unit may be wirelessly connected to the MES 5. The captured gestures may trigger specific processes in the MES 5.

Figure 2:
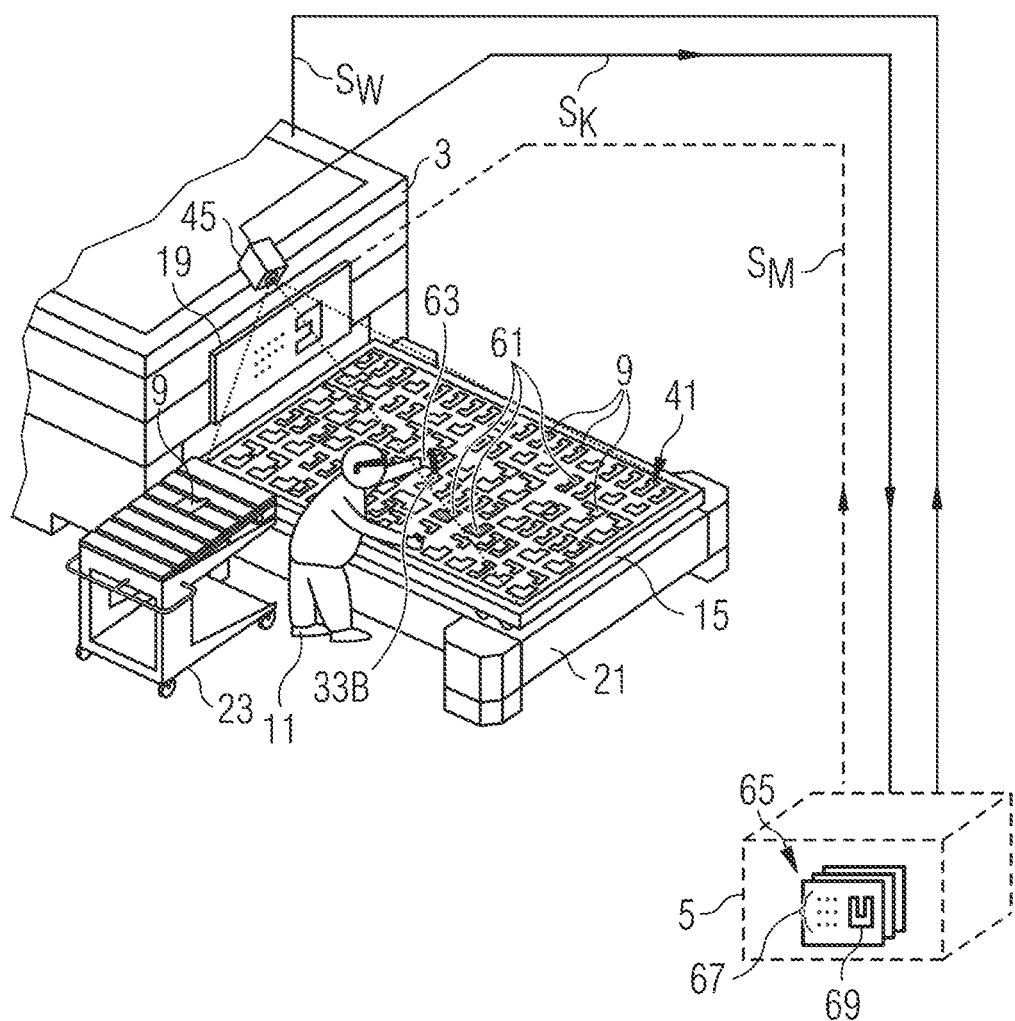
FIG. 2 shows a schematic representation for exemplary elucidation of a selection of rejected workpieces at a sorting out table of a flatbed machine tool.

FIG. 2 shows an exemplary common selection of a plurality of workpieces at 61 as rejects. Like in FIG. 1, the flatbed machine tool 3 has output workpieces 9 lying on a pallet 15 in a support plane 41. To this end, FIG. 2 schematically elucidates how the machine controller/the MES 5 drives the flatbed machine tool 3 to implement a processing process according to the processing plan 65 and produce workpieces 9.

The processing plan 65 has been stored in the machine controller in machine readable fashion. By way of example, the processing plan 65 provides geometric contours and relative positions (reference points) of the workpieces in workpiece position data records 67. Together, the workpiece position data records 67 define an arrangement of workpieces (nested arrangement) in a plane, that is to say the relative position of the workpieces in relation to one another. The nested arrangement and the workpiece position data of the workpieces to be produced can be transferred both for the manufacture in plate coordinates of a "planned material plate to be processed" (generally of a planar material) and for sorting out following the production in coordinates of the support plane 41 of the pallet 15.

Figure 3:
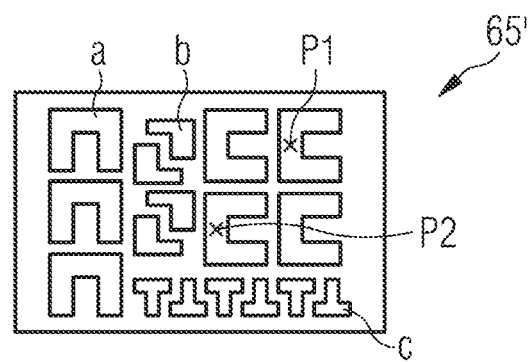
FIG. 3 shows a schematic representation of exemplary nesting of workpieces, as they can form the basis for a processing plan for a flatbed machine tool.

FIG. 3 shows a schematic processing plan 65' for producing an arrangement of workpieces. Three types of workpieces a, b, c and reference points P1, P2 (e.g., area centroids or puncture points) have been indicated in exemplary fashion. The reference points P1, P2 may represent workpiece position data as coordinates of a reference point of a workpiece in a reference plane. Further, workpiece position data may comprise a shape of the workpiece (e.g., the outer contour given by the cutting path).

Referring to FIG. 2 again, the processing plan 65 further comprises workpiece information regarding the workpieces 9 to be produced. The workpiece information may comprise order-specific information (order characteristics) regarding the individual workpieces, for example an order number, a required number of the various types of workpieces and possibly further subsequent processing steps for the workpieces. Additionally, the workpiece information in the processing plan may comprise workpiece image data 69 of the workpieces to be manufactured (e.g., digital views of technical drawings) and a digital view of the nesting arrangement generated from the workpiece image data.

For manufacturing, the processing plan is transformed into machine coordinates of the flatbed machine tool 3. By way of example, the machine tool controller 5 can drive the movement of the laser cutting head of the material plate along the contours of the planned workpieces at the planned relative position within the arrangement of workpieces and can set the laser cutting parameters. To carry out a processing process, the machine tool controller 5 outputs a driving signal $S_W$ to the processing unit 3.

In FIG. 2, following processing, the cut workpieces 9 are present as "cut goods" on the pallet 15 in the overarching shape of the original material plate and are accordingly arranged in planar fashion with respect to one another in the support plane 41. The workpieces 9 are surrounded by so-called residual grid, that is to say material of the plate that could not be used for the workpieces 9. The workpieces 9 might still be detachably connected to the residual grid by way of so-called micro joints.

Returning to the selection of rejects, the user 11 successively identifies a plurality of workpieces as rejects by way of a gesture in the form of a tapping movement with a stylus 63. That is to say, the user taps each workpiece 61 identified as a reject. In the example of FIG. 2, the locating system 31 registers the position of the selection support unit (in this case the tip of the stylus 63) as position of the hand (by image processing or a mobile unit 33A of a UWB locating system). Each tapping movement defines a selection time for an "assigned" workpiece. To be able to determine the position of the selection assistance unit, and hence that of the hand, over e.g. the cut sheet on the pallet, the locating system 31, in this case the images from the camera 45, is calibrated in relation to the coordinate system of the sorting table. Selection positions in the support plane 41 are derived for the various selection times and the corresponding workpieces are registered together. By way of example, position data of the tip of the stylus 63 in or near the support plane 41 can be derived as selection position.

By way of example, the tapping movement can be registered by a camera system for capturing two-dimensional or three-dimensional recordings of the sorting table with the workpieces 9. A plurality of cameras may also be used for multi-dimensional recordings, or recordings of a plurality of cameras can be combined to form a two-dimensional image. In FIG. 2, the camera 45 is attached centrally in respect of the pallet 15 on the machine tool 3 in exemplary fashion and is aligned with respect to the pallet 15/the sorting table for recording the latter. The tapping movement can be output as position data of strung-together positions of the stylus 63 (or else of the finger, more generally of the hand), which are accordingly assessed as a gesture. The strung-together positions can at the same time be used to determine the selection position in the support plane 41. By way of example, the selection plane can be derived as lying in the continuation of the strung-together positions.

For the concepts disclosed herein, use can be made of, for example, a camera system for image capture, as is described in WO 2018/073419 A1, cited at the outset, for assistance with sorting out workpieces or as is described in the German patent application DE 10 2018 133 524.5 by the applicant, yet to be published but filed on Dec. 21, 2018, in respect of the processing of residual grids.

Figure 4:
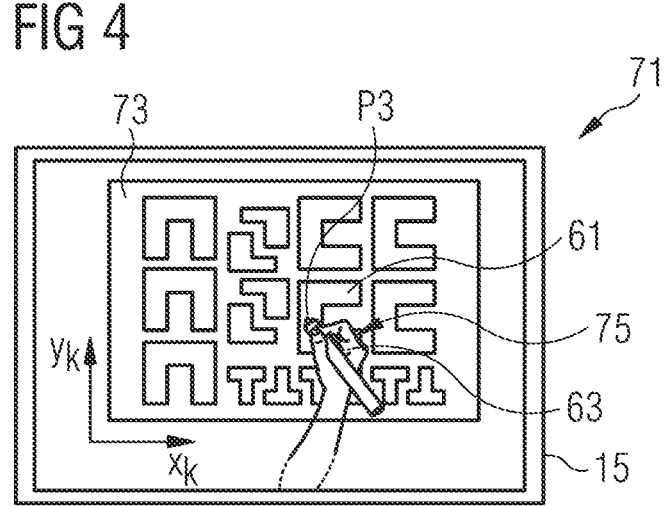
FIG. 4 shows a schematic representation of a camera image of a top view of a pallet during a tapping movement on a workpiece of an arrangement of workpieces as they are cut out and ready for singulation according to the processing plan depicted in FIG. 3.

FIG. 4 shows an image 71 of the pallet 15 on which a material plate 73 is located, the latter having been processed in accordance with the processing plan 65' shown in FIG. 3. In addition to the indicated workpieces, it is possible to recognize a hand 75 of the user 11, which contacts or taps a workpiece 61 using the stylus 63. Further, an image coordinate system ($X_K$, $Y_K$) and a reference point P3 of the hand 75 (in this case, the tip of the stylus 63 as an example for hand position data) have been plotted in the image 71.

By way of example, hand position data may comprise a reference point of the recognized hand and/or an extent of the recognized hand/of the recognized stylus in a plane parallel to the material plate as coordinates. In FIG. 4, the tip of the stylus 63 is calculated from the image data as reference point P3. Alternatively, the reference point can be the position of a marking on a glove worn on the hand (see FIG. 1), on an armband worn on the wrist or on any other wearable.

As indicated in FIG. 2 by a (camera) signal connection SK, the camera 45 transmits image data of the image 71 to the machine controller/MES 5, in which an image processing algorithm is carried out in order to track the position of the hand and optionally to register gestures. By means of a (spatially calibrated) recording of the output material plate (of the cut goods in the residual grid) by the camera 45, it is possible to transform the workpiece position data 67 of the workpieces 9 produced according to the processing plan 65 into a coordinate system of the locating system 31.

Following the selection of the workpieces, the information to be logged, which is assigned to the gesture movement in a database, is now selected with the aid of a gesture movement. By way of example, a gesture representing a reject can be carried out for the captured workpieces such that the workpiece data records of the selected workpieces are linked to the "reject" information item. By way of example, the information to be logged may represent a classification as a reject and the selected workpiece data record can optionally be included in a reject list.

FIG. 2 further elucidates that order information in respect of a selected workpiece can be displayed on the display 19 (monitor connection SM). Further, the shape of the workpiece can be depicted to assist the user 11 with the visual inspection.

In summary, FIG. 5 shows a flowchart for elucidating an exemplary method procedure for linking information with a workpiece data record of a workpiece. In the process, the assumption is made that workpieces are arranged in a sorting table, said workpieces having been produced by a flatbed machine tool, in particular a laser cutting or punching flatbed machine tool, on the basis of a processing plan (step 101).

In the next step, a selection time is registered by a first action of a user (step 103). In this case, the first action has a spatial relationship with the workpiece to be selected. By way of example, the user selects a workpiece using a first (specific) gesture (selection gesture movement). By way of example, this first gesture is fast tapping on the workpiece. The tapping movement can be registered by a camera or a locating system. Alternatively or in addition, the user may wear an acceleration sensor on the wrist, said acceleration sensor being coupled to one or more receivers by radio. As part of the MES, the receiver can carry out the data evaluation and the position determination, and the recognition of the selection gesture movement. A further alternative for recognizing the selection gesture movement lies in the activation of a pressure-sensitive stylus as a first action. The latter can be located precisely and direct tapping on the workpiece cannot lead to mix-ups even in the case of parts located closely next to one another since the position determination is triggered by the pressure sensor.

The pressure-sensitive stylus may comprise a pressure-sensitive pressure sensor, in particular in a tip of the stylus, and may further be designed to output a trigger signal when the pressure sensor is activated. Hence, pressing the stylus on the workpiece to be selected (as an example of a first action) may lead to the activation of the pressure sensor and hence to the output of a trigger signal by the stylus. If the trigger signal is registered, the selection time can be defined as the time at which the trigger signal is registered.

At the selection time, a position of a hand of the operator in space above the arrangement of workpieces is determined using a locating system (step 105). In general, the positions of the hand registered by the locating system can be restricted to the selection time or to a time window around the selection time. By way of example, the position of the wrist which wears the armband with the acceleration sensor can be determined by way of the interior localization or by way of the camera system on its own, and also by way of a combination of both.

A selection position in the support plane can be determined from the determined position of the hand (step 107). A workpiece data record can be selected from the workpiece data records by comparing the selection position with the relative positions and the contours of the workpieces (step 109) and can be labeled as a workpiece data record selected by the first action. If the system registers, e.g., the first gesture/the triggering of the pressure-sensitive stylus, it is possible to link the gesture to the workpiece with the aid of the position of the hand in the image at this time and/or by an interior localization of the hand at this time. To this end, the current relative sheet position, and hence relative position of the parts on the pallet/on the sorting table, can be determined by way of the camera system. An (image processing/evaluation) algorithm can now interpret the image data and the position data of the wrist of the user and the data about the relative tool position and the identified action (first gesture) for a correct selection of the workpiece.

Step 109 may comprise capturing the relative position of the arrangement of workpieces in the support plane using a camera (step 109A). Further, step 109 may comprise a generation of transformed data of the relative positions and contours of the workpieces by transforming the relative positions and contours of the workpieces into the support plane on the basis of the captured relative position of the arrangement of workpieces (step 109B) and a comparison of the selection position with the transformed data of the relative positions and contours of the workpieces (step 109C).

The further gesture is carried out as a second action (step 111) after the workpiece has been selected. By way of example, the gesture has been assigned the instructions to log the workpiece as a reject (step 112) and, in particular, to place the latter on a reject list. Consequently, a gesture recognition which can be carried out by means of acceleration sensors in an armband, for example, forms the basis for the at least one second action. The algorithm can now correctly interpret the selected workpiece data records and the recognized second gesture or the information assigned thereto for the user inputs such that the information to be logged can be read from a database of the MES (step 113).

Now, the information to be logged can be linked with the selected workpiece data record (step 115).

A further user interaction for linking the information to be logged with the selected workpiece data record (user input) has been rendered obsolete. The implemented user input can be displayed by way of a monitor, which for example is attached to the machine back wall (step 117A). In particular, this can be displayed together with workpiece-specific information relating to the workpiece data record selected by the first action, the workpiece-specific information optionally being able to comprise customer information, information in relation to the subsequent process step, a number of further parts that are the same, an assigned workpiece collection location or an order number for the workpiece belonging to the selected workpiece data record.

Further, feedback can be output, for instance vibration feedback or visual feedback or acoustic (sound/voice) feedback (step 117B). The user can consequently monitor and/or verify the implementation of the input into the system.

A supplementary production signal can be output to the MES for identified rejects (step 119). In the MES, production parameters of the taken workpiece are for example compared with a subsequent processing plan. In the case of correspondence of the production parameter with the subsequent processing plan and an availability of a renewed production of the taken workpiece, it is possible to complement the subsequent production plan with a production step for producing a replacement workpiece for the reject. The production of a replacement workpiece can also be provided in later, subsequent processing plans.

With reference to FIGS. 1 and 2, the communication in the steps explained above in exemplary fashion can be based on a data connection of the locating system (e.g., for position transmission) and the selection assistance unit (e.g., for sensor signal transmission) with the control unit of the flatbed machine tool 3 and/or the MES 5. In general, data interchange can be implemented by data cable using usual data connections, e.g., CAN, Profibus, RS232, RS485, USB, LAN, etc. However, in particular it can also be implemented by infrared or radio (WLAN, Wi-Fi, etc.).

Expressed differently, it is an object of the concepts presented here in to link an input by a user ("user input") in the form of gestures with a selected component (workpiece), the selection of a component being assisted by a preceding gesture. Without any further inputs, the user can readily undertake component-related inputs or can let commands be carried out. Consequently, a manual assignment of information to a component is dispensed with for the user. By way of example, logging as a reject need not be manually assigned to a specific component and an input on an input console is dispensed with.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for linking information with a workpiece data record of a workpiece in an arrangement of workpieces located in a support plane of a sorting table, the workpieces having been produced from a planar material by a flatbed machine tool in accordance with a processing plan stored in a control unit of the flatbed machine tool, the processing plan comprising workpiece data records, in which relative positions and contours of the workpieces in the arrangement of workpieces are stored, the method comprising:
    registering a selection time relating to a first action of a user that has a spatial relationship with a workpiece to be selected,
    determining a position of a hand of the user in a space above the arrangement of workpieces at the selection time using a locating system,
    deriving a selection position in the support plane from the determined position of the hand,
    selecting a workpiece data record corresponding to the workpiece to be selected from the workpiece data records by comparing the selection position with the relative positions and the contours of the workpieces in the arrangement of the workpieces,
    registering a second action, in which the user carries out a gesture movement, wherein an information item to be logged in a database is assigned to the gesture movement,
    reading the information item from the database, and
    linking the information item with the selected workpiece data record.

2. The method as claimed in claim 1, wherein the first action comprises a selection gesture movement that is carried out by the user above the arrangement of workpieces using the hand, the selection gesture movement is registered by an acceleration sensor worn on the hand or by the locating system.

3. The method as claimed in claim 2, wherein the selection gesture movement is a tapping movement toward the workpiece to be selected.

4. The method as claimed in claim 3, wherein the tapping movement is registered by the locating system and is output as position data of strung-together positions of the hand, and a position in the support plane, which is located in a continuation of the strung-together positions, is derived as the selection position.

5. The method as claimed in claim 1, wherein the user carries a selection assistance unit close to the hand for determining the position of the hand.

6. The method as claimed in claim 5, wherein the selection assistance unit includes at least one of an acceleration sensor, an active transmitter, or a passive transmitter.

7. The method as claimed in claim 5, wherein the selection assistance unit is part of the locating system.

8. The method as claimed in claim 1, wherein the locating system for determining the position of the hand registers a position of a stylus held in the hand, and wherein the first action comprises the stylus being tapped on the workpiece to be selected, and position data of a tip of the stylus in or near the support plane is derived as the selection position.

9. The method as claimed in claim 8, wherein the stylus comprises a pressure sensor, and the stylus is designed to output a trigger signal when the pressure sensor is activated, and
    wherein the first action comprises pressing the stylus on the workpiece to be selected for activating the pressure sensor and outputting the trigger signal by the stylus, the method further comprising
    registering the trigger signal, wherein a time when the trigger signal is registered is determined to be the selection time, and
    restricting the position of the hand registered by the locating system to the selection time or to a time window around the selection time.

10. The method as claimed in claim 1, wherein the locating system is designed to evaluate image data from one or more cameras for image-assisted determination of the position of the hand of the user.

11. The method as claimed in claim 1, wherein the locating system is based on ultra-wideband locating of a mobile unit worn near the hand and a position of the hand of the user is determined by evaluating position data of the mobile unit obtained by the locating system.

12. The method as claimed in claim 1, wherein comparing the selection position with the relative positions and the contours of the workpieces comprises:
    registering the relative positions of the arrangement of workpieces in the support plane using a camera,
    generating transformed data of the relative positions and the contours of the workpieces by transforming the relative positions and the contours of the workpieces into a coordinate system of the support plane on the basis of the registered relative positions of the arrangement of workpieces, and
    comparing the selection position with the transformed data of the relative positions and the contours of the workpieces.

13. The method as claimed in claim 1, wherein a plurality of selection positions is derived for a plurality of successively registered first actions, a plurality of selected workpiece data records is selected for the selection positions, and the plurality of selected workpiece data records is linked uniformly to the information item to be logged by registering the second action.

14. The method as claimed in claim 1, wherein the information to be logged is a classification as a reject, the method further comprising
    including the selected workpiece data record in a reject list.

15. The method as claimed in claim 1, further comprising
    displaying on a display unit workpiece-specific information in relation to the workpiece data record selected by the first action, the workpiece-specific information comprising customer information, information in relation to the subsequent process step, a number of further parts that are the same, an assigned workpiece collection location or an order number for the workpiece belonging to the selected workpiece data record, and
    supplementing the displayed workpiece-specific information with the information to be logged that is linked to the selected workpiece data record.

16. The method as claimed in claim 1, further comprising outputting feedback to the user after linking.

17. The method as claimed in claim 16, wherein the feedback is implemented by vibration feedback, visual feedback or acoustic feedback.

18. A flatbed machine tool comprising
   a processing unit,
   a control unit in which a processing plan is stored, for driving the processing unit to produce workpieces arranged in space next to one another,
   a sorting table for providing the produced workpieces which are arranged next to one another in a support plane, for sorting out by a user, and
   a locating system for determining a position of a hand of the user in space,
   the control unit being designed to carry out a method as claimed in claim 1.

19. The flatbed machine tool as claimed in claim 18, further comprising
   an acceleration sensor worn on the hand and/or
   a stylus for simplifying the locating process, the stylus being designed as a pressure-sensitive stylus with a pressure sensor which causes a trigger signal for restricting the positions of the hand for registering a gesture movement, registered by the locating system, to a time window around the registration of the trigger signal when the stylus is pressed on the workpiece and/or the stylus having an active transmitter and/or passive transmitter, the position of which is able to be registered by the locating system as position of the hand of the user.

20. The flatbed machine tool as claimed in claim 18, wherein the locating system comprises at least one antenna for receiving signals of a selection assistance unit worn/carried near the hand and/or
   wherein the locating system comprises one or more cameras for capturing the image of the position of the hand of the user and/or of a selection assistance unit.

* * * * *